Oct. 21, 1930.   A. ARUTUNOFF   1,778,787
MOTOR PROTECTOR
Filed April 15, 1927
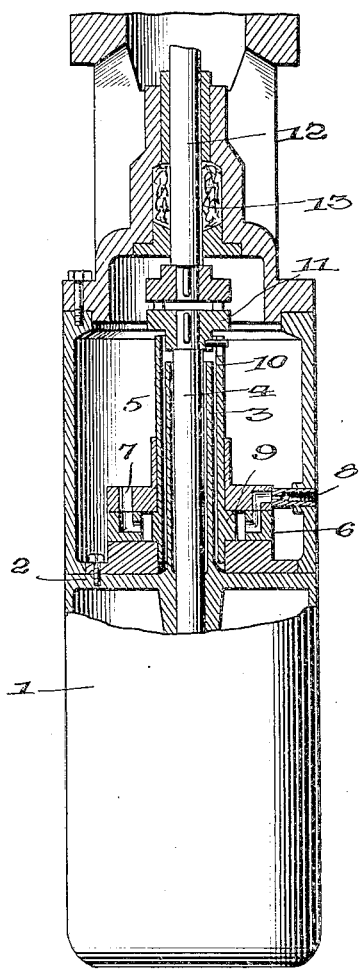
Inventor
A. Arutunoff,
By
Attorney Patented Oct. 21, 1930

1,778,787

UNITED STATES PATENT OFFICE

ARMAIS ARUTUNOFF, OF LOS ANGELES, CALIFORNIA, ASSIGNOR TO REDA PUMP COMPANY, OF BARTLESVILLE, OKLAHOMA, A CORPORATION OF DELAWARE

MOTOR PROTECTOR

Application filed April 15, 1927. Serial No. 183,991.

My invention consists in new and useful improvements in submergible electric motors for driving pumps or other machinery and has for its object to provide means for protecting said motor from surrounding liquid while in operation.

Another object of my invention is to provide protecting means for the motor, contained in the motor housing or embodied in the motor structure.

With the above and other objects in view which will appear as the description proceeds, my invention consists in the novel features herein set forth, illustrated in the accompanying drawing and more particularly set out in the appended claims.

The figure shown in the drawing is a view partly in section showing the position of the parts of my improved protector.

In the drawing, 1 represents the housing or casing of an electric submergible motor of any conventional type. 2 is a partition having an upwardly extending sleeve 3 surrounding the motor shaft 4, forming a reservoir 5 in the upper portion of said casing. In the lower part of the reservoir 5 is located a rotary pump structure 6 having an inlet port 7 and a discharge valve 8 extending through the casing 1 and opening into the well.

The rotating member 9 of the pump 6 extends upwardly in a sleeve member 10 surrounding the sleeve 3, and operatively engages a coupling 11 on the end of the motor shaft 4, which coupling is provided for transmitting power to the adjacent shaft 12.

The operation of my device is as follows:

When the motor is running any leakage which may occur along the shaft 12 past the stuffing box 13 or any other protecting means which may be provided will drop down into the reservoir 5 and be sucked into the inlet port 7 of the pump 6 and discharged through the valve 8 into the well.

From the foregoing it is believed that my invention may be clearly understood without further description, it being borne in mind that numerous changes may be made in the details of construction without departing from the spirit of the invention as set forth in the appended claims.

What I claim and desire to secure by Letters patent is:—

1. The combination with a submergible electric motor, a casing surrounding the motor having a partition extending upwardly in a sleeve portion forming a reservoir, a rotary protecting pump in said reservoir consisting of a rotating member surrounding said sleeve member and operatively engaging the motor shaft, an inlet port in the pump within the reservoir and arranged below the upper end of said sleeve, and a discharge valve extending through said casing and opening into the well.

2. The combination with a submergible electric motor, a casing surrounding said motor, a reservoir in the upper portion of said casing, a rotary protecting pump in said reservoir around the motor shaft, the rotary member of said pump operatively engaging said shaft, an inlet port in said pump within the reservoir and arranged below the upper end of said reservoir and an outlet valve extending through said casing and opening into the well.

3. The combination with a submergible electric motor, a casing surrounding said motor, baffle means in the upper portion of said casing forming a reservoir, a rotary protecting pump in said reservoir surrounding said baffle means and operated by the motor shaft, an inlet port in said pump within the reservoir and arranged below the upper end of said baffle means, and a discharge valve extending through said casing, said pump being adapted to expel any leakage into said reservoir, directly into the well.

4. The combination with a submergible electric motor, a casing surrounding the motor having an elongated sleeve extending upwardly therefrom and surrounding the motor shaft, a second casing above said first named casing and, together with said sleeve, forming an annular reservoir, a rotary protecting pump within said reservoir surrounding said sleeve and operated by the motor shaft, an inlet port in said pump within the reservoir and arranged below the upper end of said sleeve, and a discharge valve extending through said second casing, whereby said pump is adapted to expel any leakage into said reservoir, directly into the well.

5. The combination as claimed in claim 4 wherein said sleeve is integral with said motor casing.

In testimony whereof I affix my signature.

ARMAIS ARUTUNOFF.